United States Patent Office 3,429,321
Patented Feb. 25, 1969

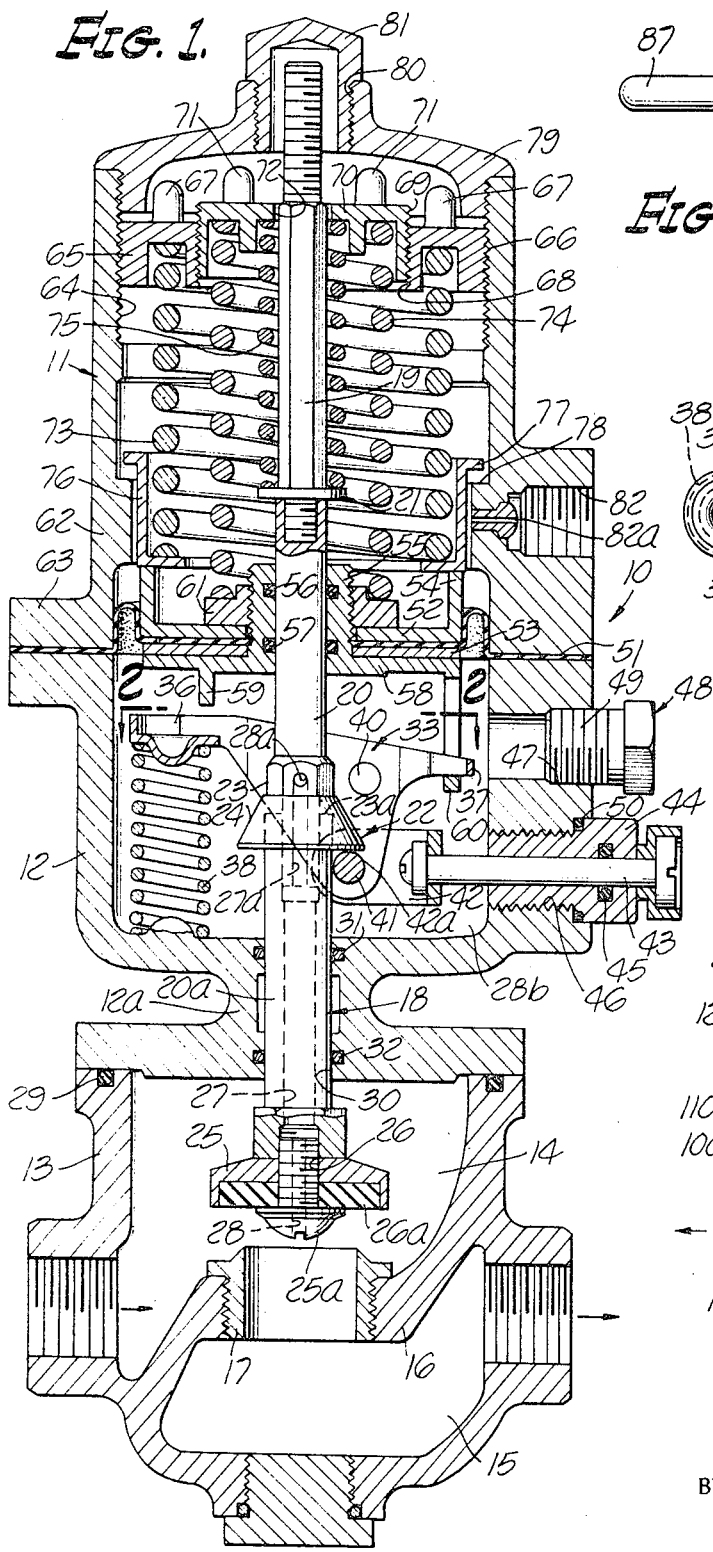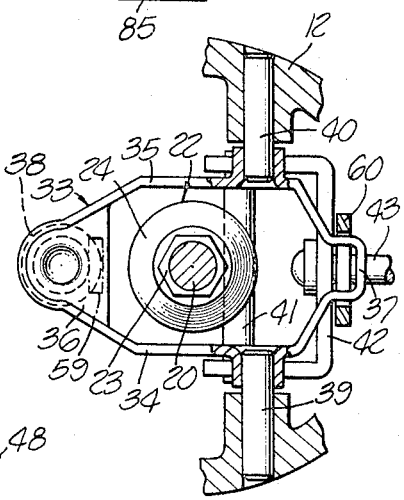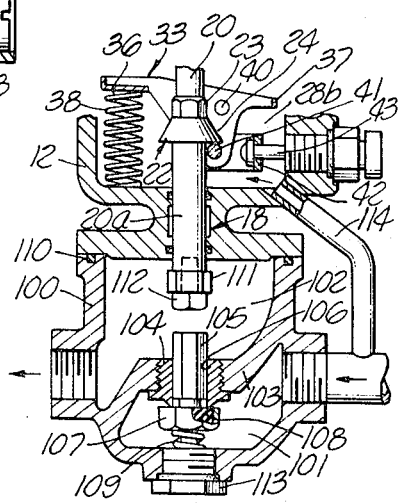

3,429,321
SAFETY VALVE ACTUATOR
Walter I. Thrall, South Pasadena, Calif., assignor to American Meter Company, Philadelphia, Pa., a corporation of Delaware
Filed Jan. 2, 1968, Ser. No. 695,053
U.S. Cl. 137—77        17 Claims
Int. Cl. F16k 17/18

ABSTRACT OF THE DISCLOSURE

A valve actuator responds to overpressure or underpressure outside a preselected range to operate a movable valve part, both ends of the range being adjustable, and the force applied by the actuator is unaffected by the intensity of the pressure. The device also responds to manual operation, temperature or other condition.

---

This invention relates to a valve actuator apparatus and is particularly directed to improvements in controlling the flow of fluid when the fluid pressure either exceeds a predetermined maximum or drops below a predetermined minimum.

Such a device is particularly useful in those situations where the increase or decrease in pressure would create a hazardous condition. Such is the situation where the pressure in a fluid flow line becomes high enough to cause a break in the line or exceeds the safe maximum pressure for the system, or where there is a leak in the line indicated by low pressure.

The present invention responds to either a predetermined maximum or minimum pressure, but more important, the high and low ends of the pressure range can be easily adjusted and are independent of one another. This added feature makes the device adaptable to a variety of fluid flow systems. Furthermore, once the device has been installed in a system either the high pressure limit or the low pressure limit can be adjusted to give improved performance.

Because the invention can also respond to a temperature change as well as a pressure change, it is useful in fire prevention.

Furthermore, the invention can be adapted to respond to a sudden movement and thereby protect a system in an earthquake condition.

Other advantages of this invention will appear from the following description and the accompanying drawings, wherein:

FIGURE 1 is a sectional view showing a preferred embodiment of this invention.

FIGURE 2 is a sectional view taken substantially on the lines 2—2 as shown in FIGURE 1.

FIGURE 3 is a sectional view showing a preferred embodiment of the reset key used in connection with this invention.

FIGURE 4 is a fragmentary view in section showing a modification.

Referring to the drawings, a casing assembly generally designated 10 includes a spring housing 11, a release housing 12 and a valve body 13. While the valve body 13 can be formed in various ways, the preferred embodiment as shown in FIGURE 1 discloses a normally open valve. The valve body 13 contains an inlet chamber 14 and an outlet chamber 15 separated by a divisional web 16. The web 16 has an opening which is internally threaded to receive a stationary valve seat 17.

A stem assembly generally designated 18 is centrally positioned within and extends throughout the spring housing 11 and the release housing 12 and into the valve body 13. The stem assembly 18 includes a hexagonal shaft 19, a round shaft 20 and another larger round shaft 20a. The hexagonal shaft 19 is threaded externally at both ends with the lower end connected to the internally threaded upper end of the round shaft 20. Fixed between the two shafts 19 and 20 is a circular collar 21. Round shaft 20 has a smooth surface and may be chrome plated or otherwise treated to decrease surface friction. A circular cam member 22 is mounted coaxially between a hexagonal portion 23 of shaft 20 and a shoulder 23a of shaft 20a. The outer surface 24 of cam member 22 is conical and extends in a downward and outward fashion. The shaft 20a is hexagonally shaped and internally threaded at its lower end. Connected to this hexagonal end is a valve head 25.

The valve head 25 is held in place by means of a screw 25a which passes through a central opening 26 in the valve head 25 and engages the internal threads in the lower end of shaft 20a. A seal ring 26a fits concentrically with the valve head 25 and the valve seat 17 when the valve is in a closed position. Shaft 20a is hollow to form the passage 27 which coincides with a similar passage 27a in the lower end of shaft 20. A central opening 28 in the screw 25a and circular openings 28a in the hexagonal portion of shaft 20 provides for pressure communication between the outlet chamber 15 and the diaphragm chamber 28b.

The release housing 12 is cup-like in shape with a narrow stem portion 12a and a flanged base which is connected to the valve body 13. An O-ring 29 seals the release housing 12 to the valve body 13. The stem portion 12a is provided with a central circular opening 30 in which the shaft 20a vertically slides. An O-ring 31 seals the shaft 20a to the release housing 12. A wiper 32 prevents dirt particles from interfering with the O-ring 31.

Within the release housing 12 is a bifurcated trigger 33, with the shaft 20 positioned between two parallel identical sides 34 and 35 of the trigger 33. The trigger 33 is provided with lever arms 36 and 37. A spring 38 is mounted between the underside of lever arm 36 and the inner surface of the horizontal wall of the release housing 12 to hold the trigger in position as shown in FIGURE 1. Spaced pins 39 and 40 are mounted within the walls of the housing 12 and provide an axis about which the trigger 33 pivots. A cylindrical rod 41 extends through aligned openings 42a in the legs of a U shaped connector 42 and the ends of rod 41 are connected to the sides 34 and 35, respectively, with the lower surface of cam member 22 engaging the cylindrical rod 41. A pull rod 43 is connected to the U shaped connector 42 and is slidably mounted within a sleeve guide 44. O-ring 45 seals the pull rod 43 to the sleeve guide 44 and prevents leakage. Threaded openings 46 and 47 in the side wall of the release housing 12 receive the sleeve guide 43 and a plug 48, respectively. An O-ring 50 prevents leakage between the sleeve guide 43 and the release housing 12.

Secured between and separating the spring housing 11 and the release housing 12 is a flexible diaphragm 51. The inner edge of the diaphragm 51 is held between a pair of disks 52 and 53. The disk 52 is mounted on the upper surface of the diaphragm and has a vertical flange 54 which extends upward. Disks 52 and 53 and the diaphragm 51 are provided with aligned central openings and mounted coaxially within these openings is a sleeve 55 in which a portion of shaft 20 slides vertically. An O-ring 56 and wiper 57 seal the shaft 20 to the sleeve 55 and prevent leakage. The sleeve 55 extends outwardly at the bottom to form a plate 58 to hold the disk 53 and the lower side of the plate 58 is provided with a pusher 59 and a stirrup 60. The inner edge of the diaphragm 51 is held between the disk 52 and disk 53 by tightening a threaded ring 61 on the external threads on sleeve 55 and against the disk 52.

The spring housing 11 includes a generally cylindrical body 62 having a flange 63 and internal threads 64. Positioned coaxially within the body 62 is an annular maximum-pressure adjusting collar 65 having external threads 66 which engage the threads 64. The maximum-pressure adjusting collar 65 is provided with lugs 67 which enable the collar to be turned within the body 62 to move the collar 65 axially along the threads 64. Internal threads 68 on the collar 65 engage the external threads 69 on a minimum-pressure adjusting collar 70, which is positioned coaxially within both the body 62 and the collar 65. Lugs 71 enable the collar 70 to be turned and adjusted axially. The collar 70 has a central opening 72 which receives the hexagonal shaft 19. A maximum-pressure spring 73, a minimum-pressure spring 74, and a valve closing spring 75 are positioned concentrically in the body 62. The upper end of the spring 73 engages the collar 65.

A carrier 76 holds the lower end of spring 73 and is provided with a flange 77 extending outwardly. The travel of the carrier is limited by a shoulder 78 on the inner wall of the body 62 which engages the flange 77. the lower side of the carrier 76 meets the flange 54 on the disk 52. The ends of the spring 74 are positioned between the collar 70 and the ring 61. The upper end of the closing spring 75 is also held by the collar 70 with the lower end abutting the collar 21 on the stem assembly 18.

A spring cap 79 is connected to the body 62 and is provided with a threaded central opening 80 which receives a cap closure screw 81. The body 62 has a vent opening 82 which allows the pressure in the spring housing 11 to be controlled. A restrictive passage 82a in the vent 82 will prevent flow out of the spring housing 11 in excess of its capacity, thereby activating the valve when the leakage past the diaphragm 51 exceeds a predetermined amount.

The operation of the device as shown in FIGURES 1-3 is as follows: The maximum-pressure spring 73 and minimum-pressure spring 74 are each adjusted to exert the desired axial force. With the valve in an open position as shown, fluid under pressure passes from chamber 14 through the passage 27 into the diaphragm chamber 28b and exerts a force against the lower surface of the diaphragm 51. When this force exceeds the downward force on the diaphragm 51 exerted by the springs 73 and 74, the diaphragm 51 moves upward, carrying the stirrup 60 with it. As the stirrup 60 moves upward, it engages the lever arm 37 on the trigger 33, causing the trigger 33 to turn about the aligned pins 39 and 40, and thereby moving the cylindrical rod 41 out from under the lower wall of the cam member 22. When this happens the closing spring 75 forces the stem assembly 18 down until the seal ring 26a in the valve head 25 engages the seat 17, thereby closing the passage between the outlet chamber 15 and the inlet chamber 14. The upstream pressure will hold the valve closed.

Similarly, should the fluid pressure in the diaphragm chamber 28b fall below the pressure exerted by the minimum-pressure adjusting spring 74, the spring 74 will force the diaphragm 51 downward causing the pusher 59 to engage the lever arm 36 of the trigger 33 and turn it about the pins 39 and 40, thereby forcing the cylindrical rod 41 out from under the lower wall of the cam member 22. This causes the stem assembly 18 to move axially downward and close the passage between the inlet chamber 14 and the outlet chamber 15.

The spring 73 is active only until flange 77 engages shoulder 78; further downward movement of the diaphragm is caused by force of spring 74 only.

The valve can also be closed manually by pulling the pull rod 43 which in turn will force the cylindrical rod 41 out from under the cam member 22, thereby causing the stem assembly 18 to move downward to close the passage between the inlet and outlet chambers. The plug 48 is provided with a fusible metal core 49 which melts when the temperature reaches a predetermined maximum, thereby allowing the fluid in the diaphragm chamber 28b to escape and create low pressure in the diaphragm chamber. This in turn causes actuation of the trigger and descent of the stem assembly 18, as described above.

When it is desired to re-set the valve actuator apparatus to place it back in service after descent of the stem assembly 18, the cap closure 81 is removed and the key assembly 84 is secured to the hexagonal shaft 19. The internal threads 85 in the key assembly 84 receive the external threads on the upper end of the hexagonal shaft 19. The key assembly 84 is then screwed down until the collar 86 mounted coaxially on the key assembly 84 makes contact with the cap 79 and causes the valve to partially open. The key assembly 84 is then manually lifted by the handle 87 until the cam member 22 on the stem assembly 18 passes above the cylindrical rod 41, swinging it aside en route. The key assembly 84 is then removed and the cap closure 81 installed.

FIGURE 4 shows the actuator device applied to a modified form of valve. The valve body 100 has an inlet chamber 101 and an outlet chamber 102 separated by a divisional web 103. The web 103 has an internally threaded opening to receive a valve seat 104. A hexagonal valve member 105 which moves vertically within an opening 106 in the seat 104 is provided with a disk valve head 107 and a sealing ring 108. A cup member 113 is inserted into the lower wall of the inlet chamber 101 and holds a compression spring 109. Spring 109 engages the lower surface of the disk valve 107 and forces the sealing ring 108 against the seat 104 when the valve is in the closed position, as shown in FIGURE 4. The valve body 100 is connected to the release housing 12 and an O-ring 110 prevents leakage.

The stem assembly 18 at its lower end 111 is hexagonal shaped and is provided with internal threads. A screw 112 engages the threads and provides a means for actuating the valve member 105. A passage 114 provides for communication of fluid between the inlet chamber 101 and the diaphragm chamber 28b. As before, the stem assembly moves axially downward when the fluid pressure in the diaphragm chamber 28b drops below a desired minimum or increases above a set maximum. When the stem assembly 18 moves axially downward it engages the upper end of the valve member 105, thereby forcing the sealing ring 108 away from the seat 104 and opening the passage between the inlet and outlet chambers 101 and 102, respectively.

I claim:

1. In a valve actuator device, the combination of: a stationary casing including a valve body, a stem mounted for axial movement within the casing and having a projecting portion extending into said valve body, a floating member mounted for axial movement within said casing, means preventing leakage between said floating member and said casing, said casing, floating member, stem and said means defining a chamber, passage means to provide communication between said chamber and the interior of said valve body, trigger means normally acting to prevent downward movement of said stem, first resilient means operatively positioned to exert a downward force on said floating member against fluid pressure in said chamber, means limiting the extent of travel of said first resilient means, second resilient means operatively positioned to exert a downward force on said floating member, means whereby the force of each of said resilient means may be independently adjusted, means operated by said floating member for releasing said trigger means upon movement of said floating member in either direction beyond a predetermined extent, and means for moving said stem axially downward upon release of said trigger means.

2. The combination set forth in claim 1 in which each of said resilient means comprises a coil compression spring.

3. The combination set forth in claim 1 in which the trigger means is positioned within the chamber.

4. The combination set forth in claim 1 in which said passage means is within said projecting portion of said stem.

5. The combination set forth in claim 1 in which said passage means includes a conduit exterior of said valve body and connected to said chamber.

6. The combination set forth in claim 1 in which additional means are provided for releasing said trigger means.

7. The combination set forth in claim 6 in which said additional means is manually operable from a location outside said chamber.

8. In a valve actuator device, the combination of: a stationary casing including a valve body, a stem mounted for axial movement within the casing and having a projecting portion extending into said valve body, a floating member mounted for axial movement within said casing, a flexible diaphragm positioned between said floating member and said casing, said casing, floating member, stem and said diaphragm defining a chamber, passage means to provide communication between said chamber and the interior of said valve body, trigger means normally acting to prevent downward movement of said stem, a first coil spring operatively positioned to exert a downward force on said floating member against fluid pressure in said chamber, means limiting the extent of travel of said first coil spring, a second coil spring operatively positioned to exert a downward force on said floating member, means associated with said casing whereby the force of each of said springs may be independently adjusted, separate means on said floating member for releasing said trigger means upon movement of said floating member in either direction beyond a predetermined extent, and resilient means for moving said stem axially downward upon release of said trigger means.

9. The combination set forth in claim 8 in which the trigger means is positioned within the chamber.

10. The combination set forth in claim 8 in which said first and second springs are concentric and encircle a portion of said stem.

11. The combination set forth in claim 8 in which manually operable means are provided for releasing the trigger means.

12. The combination set forth in claim 8 in which means are provided for venting said chamber.

13. The combination set forth in claim 12 in which the venting means is temperature responsive.

14. In a valve actuator device, the combination of: a stationary casing including a valve body, a stem mounted for axial movement within the casing and having a projecting portion extending into said valve body, a floating member mounted for axial movement within said casing, a flexible diaphragm positioned between said floating member and said casing, said casing, said floating member, stem and said diaphragm defining a chamber, passage means to provide communication between said chamber and the interior of said valve body, resilient means operatively positioned to exert a downward force on said floating member against fluid pressure in said chamber, trigger means in said chamber normally acting to prevent downward movement of said stem; said trigger means including a trigger pivotally mounted on said casing and having an abutment, means on said stem having a downward facing shoulder adapted to engage said abutment, means operated by said floating member for swinging said trigger means in a direction to move the abutment out from under said shoulder upon movement of said floating member in either direction beyond a predetermined extent, and means for moving said stem axially downward upon release of said trigger means.

15. The combination set forth in claim 14 in which manual means are provided for pivoting said trigger in said direction.

16. The combination set forth in claim 14 in which means are provided for venting said chamber.

17. The combination set forth in claim 16 in which the venting means is temperature responsive.

References Cited

UNITED STATES PATENTS

| 1,727,503 | 9/1929 | Franzheim | 137—463 |
|---|---|---|---|
| 2,484,940 | 10/1949 | Franzheim | 137—77 |
| 2,701,580 | 2/1955 | Sullivan | 137—458 |

HAROLD W. WEAKLEY, *Primary Examiner.*

U.S. Cl. X.R.

137—458, 463